May 11, 1943.  F. O. CALVIN ET AL  2,319,111
SOUND MOTION PICTURE PROJECTOR
Filed Jan. 9, 1940   2 Sheets-Sheet 1
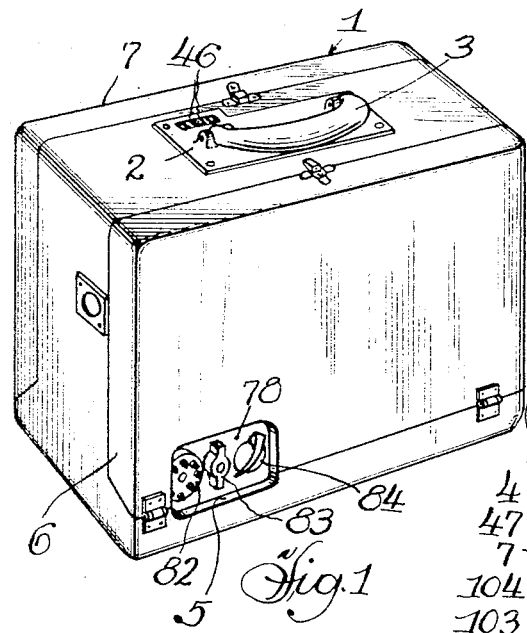
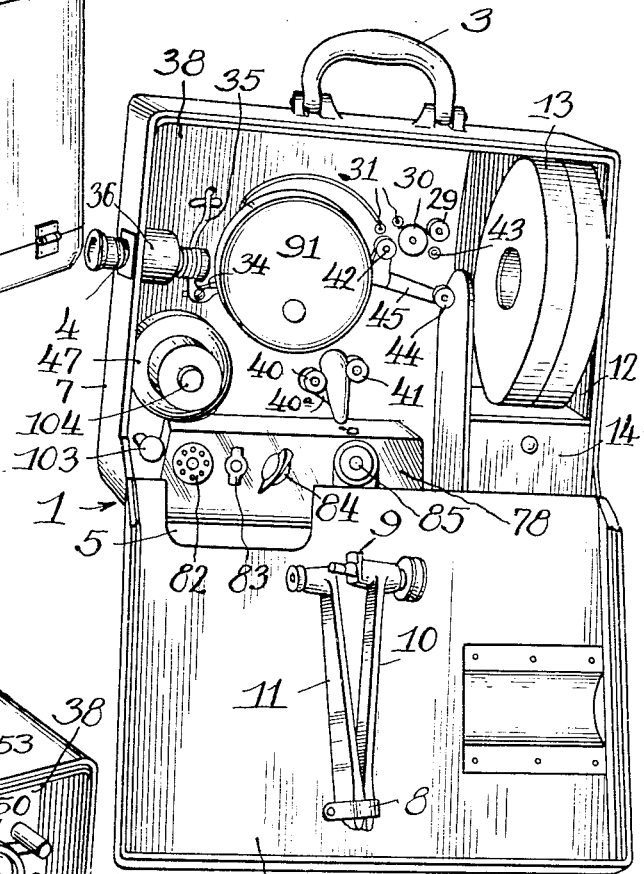
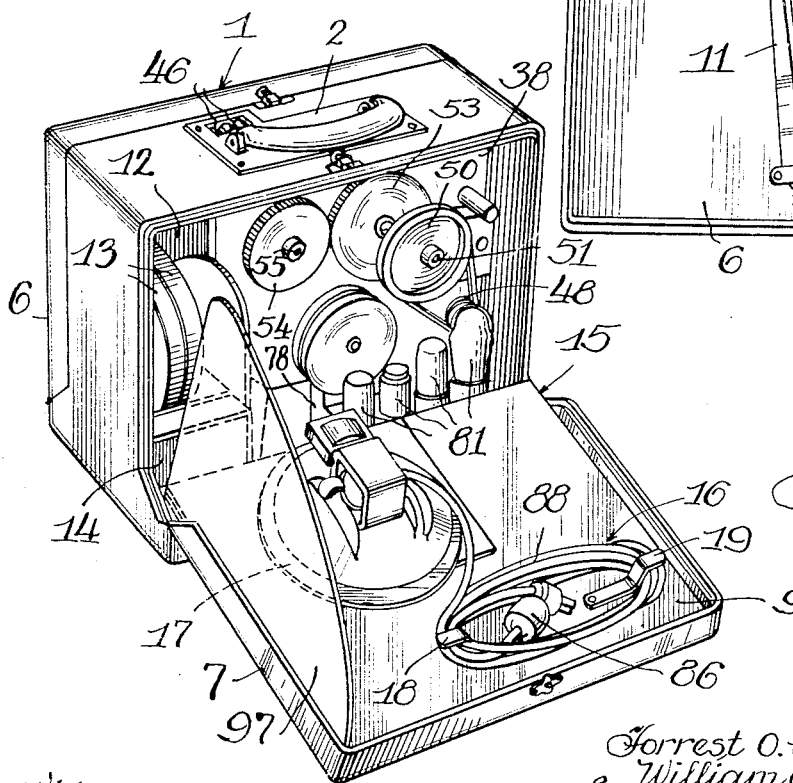
INVENTORS.
Forrest O. Calvin
and William G. Wilson
and Thomas R. Smith
Parkinson & Lane ATTORNEYS.
Witness:
Chas. R. Koursh.

May 11, 1943. F. O. CALVIN ET AL 2,319,111
SOUND MOTION PICTURE PROJECTOR
Filed Jan. 9, 1940 2 Sheets-Sheet 2

INVENTORS.
Forrest O. Calvin
William G. Wilson
Thomas R. Smith
Parkinson & Lane ATTORNEYS.

Witness:
Chas. R. Koursh.

Patented May 11, 1943

2,319,111

UNITED STATES PATENT OFFICE

2,319,111

SOUND MOTION PICTURE PROJECTOR

Forrest O. Calvin and William G. Wilson, Kansas City, Mo., and Thomas R. Smith, Newton, Iowa, assignors to Movie-Mite Corporation, Kansas City, Mo., a corporation of Missouri Application January 9, 1940, Serial No. 313,088

2 Claims. (Cl. 88—16.2)

The present invention relates to a sound motion picture projector for the simultaneous and synchronous projection of sound and motion pictures. The invention is particularly adapted for use in homes, schools, and for sales and educational purposes where a compact, self-enclosed and inexpensive unit is desired or required. The novel assembly of the present invention forms a unit which is simple and inexpensive to operate, is light in weight so that it may be easily and quickly transported or carried about, requires a minimum of space for operation and is complete in every detail and includes every item of equipment necessary for a satisfactory sound motion picture performance.

The novel construction comprises a minimum number of parts which are so designed as to lend themselves to an inexpensive production in large quantities by quantity production methods, and these parts are so related and combined that their assembly may be inexpensively and quickly accomplished. By providing such a mechanism with a minimum number of moving parts and of substantial construction, the invention comprehends a talking or sound motion picture projector which is capable of giving long service and trouble-free performance.

In the drawings:

Fig. 1 is a view in perspective of the sound motion picture unit enclosed within the carrying case.

Fig. 2 is a view in perspective with one side of the carrying case open to show the arrangement of parts.

Fig. 3 is a view in perspective of the novel unit with the other side of the carrying case open to show the arrangement of parts therein.

Figure 4:
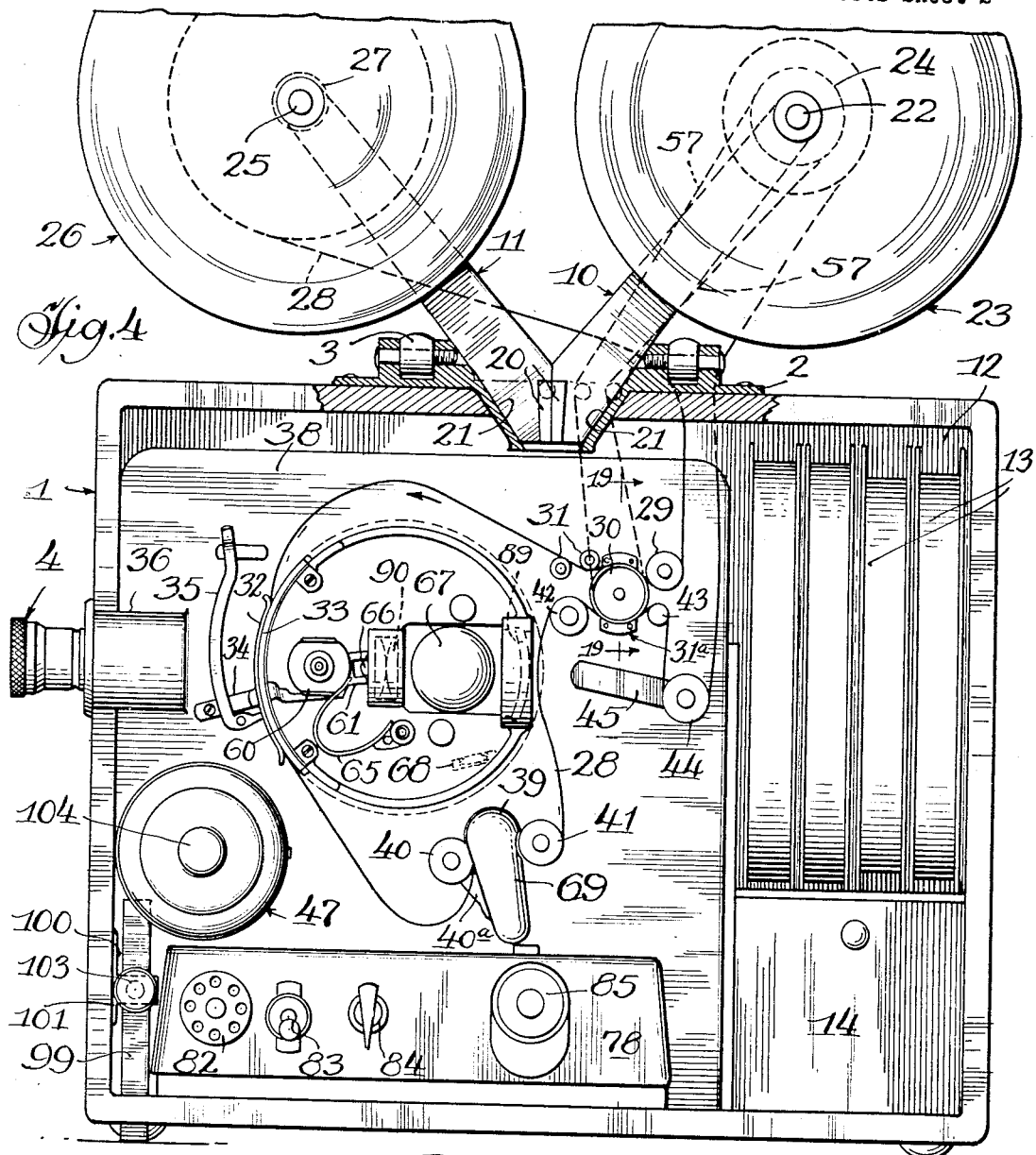
Fig. 4 is an enlarged view of the projector as shown in Fig. 2 with one side of the case removed and with the film threaded therein for normal operation.

Referring more particularly to the disclosure in Figs. 1, 2 and 3 of the drawings, the illustrated embodiment of our invention comprises a case 1 for transporting or carrying the projector and in which the entire unit is assembled. In the upper portion of the case is mounted a plate 2 to which is attached a handle 3. This plate acts not merely as a mounting for the handle but also serves as a mounting for the detachable reel arms, for the rollers which guide the film in and out of the case, as a mounting for the rollers which guide the take-up belt, and as a top support for the main frame of the projector mechanism, all of which will be later more fully explained.

In the front of the case is an opening in which is adjustably mounted the projector lens 4 and in a side wall is provided an opening 5 which permits access to the operating controls for the projector.

The entire assembly, including a sound and motion picture projecting mechanism is enclosed within the case 1 with certain parts detachably mounted in the sides or closures 6 and 7 for the case. As more clearly shown in Fig. 2, the side or closure 6 is provided with brackets 8 and 9 for detachably mounting the take-up reel arm 10 and the feed reel arm 11, when the projector is not in use and for transportation. A compartment 12 is provided for the take-up reel and film cans 13 holding reels of film which are to be used in the machine. Below this compartment is provided a drawer or parts cabinet 14 which provides space for carrying spare tubes, lamps, etc. and which also forms the base or rack for holding the take-up reels and film cans.

Within the confines of the side or closure 7, shown in Fig. 3 of the drawings, there is mounted a combined speaker baffle and screen unit 15, the cord 16 which supplies electrical energy to the speaker 17, and the cord which connects the projector to the source of current supply. These cords are retained by means of brackets 18 and 19.

Figure 5:
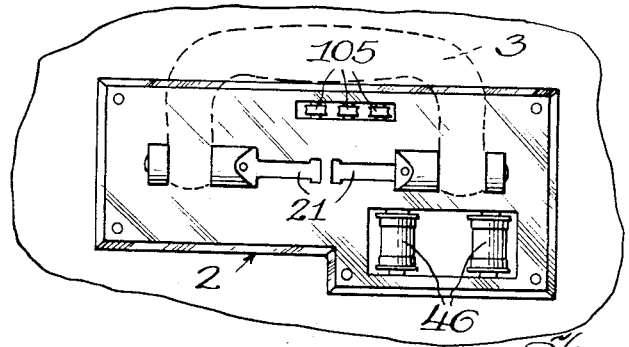
Fig. 5 is a fragmentary plan view of the upper part of the casing to show the details of the plate which fits into the top of the projector case.

The take-up reel arm 10 and the feed reel arm 11 are adapted to be detachably but securely mounted in the plate 2 in the manner shown more clearly in Figs. 4 and 5. These arms at their lower end are each provided with projecting flanges 20 adapted to interlock with and be secured in complementary or similarly shaped openings 21 of the plate 2. Within the upper end of the take-up reel arm 10 is rotatably mounted a stub shaft 22. This stub shaft projects therethrough and upon one end of the projecting portion is removably mounted a take-up reel 23 and upon the other end is secured a pulley 24. Likewise a stub shaft 25 is mounted at the upper end of the feed reel arm 11 and one end of this stub shaft is adapted to removably receive a feed reel 26 and the other end is provided with a pulley 27 which is of smaller diameter than that of the pulley 24, so that the rewinding may be accomplished rapidly when the belt is shifted from the take-up pulley 24 to the feed reel pulley 27.

In the operation of the projector, the film 28 is fed from the feed roll over a roller 29 and thence over a sprocket 30 and between guide rollers 31 to the picture aperture positioned in a pressure plate 32. The film travels in such a path as to require a minimum number of supporting parts or rollers. These parts or rollers are so placed as to make the film path of such shape that the film will not be subjected to sharp bends or other mishandling. The film 28, coming in from outside the case, is held onto the top of the sprocket 30 by means of the guide rollers 29 and 31, and the sprocket retainer 31a.

The pressure plate 32 holds the film between its surface and the surface of the apertured gate plate 33 by means of pressure applied by a leaf spring 34. Framing is accomplished by moving lever 35 which in turn moves the aperture in the pressure plate 32 up or down to the correct alignment. The frame lever 35 retains the pressure plate 32 in position. The pressure plate 32 rests in the film groove in the gate plate 33 and this pressure plate is moved up and down in this groove by operation of the lever 35, framing the film correctly. The pressure plate 32 and the gate plate 33, as well as all rollers contacting the film at any point in the projector with the exception of the sound drum, are preferably relieved over the sound track and picture areas of the film for providing film protection. The projector lens mount 36 is formed integral with or secured to the main plate 38 and provides a support for the projector lens 4, the plate 38 also providing a mounting for the projector mechanism.

The film, after leaving the confines of the pressure plate 32 and gate plate 33 is looped and guided over the sound drum 39 and held against it by means of a pad roller 40 and as it leaves the sound drum, it is guided by means of a roller 41. The roller 40 is shown as mounted on an arm 40a pivotally mounted on the sound drum cover with a spring fastened to the arm and engaging the interior of the cover in such a way as to hold the roller 40 against the sound drum 39 with the desired tension. The film, in leaving the sound drum, is then passed over a guide roller 42 and thence over the under surface of the sprocket 30 and over a guide roller 43. The rollers 42 and 43 guide the film over the bottom surface of the sprocket and these rollers, in a manner similar to the guide rollers 29 and 31 which are positioned adjacent the upper surface of the sprocket 30, are so located that the natural tendency of the film to straighten out from the bends imposed thereon keeps the film on the sprocket. The sprocket retainer 31a also locks the film on the lower surface of the sprocket in the same manner as previously described for the upper surface. Thus the top surface of the sprocket serves as a pull down and feed sprocket and the bottom surface serves as a sound, take-up and hold-back sprocket.

The film, after passing over the guide roller 43, passes over a snubber roller 44 which is mounted upon a spring control arm 45. From there, the film 28 passes onto the take-up reel 23. Rollers 46 are provided in the top plate 2, as more clearly shown in Fig. 5, over which the film passes from the feed reel and to the take-up reel.

The power unit for feeding the film and for operating the projector comprises a motor 47 having a drive pulley 48 mounted upon the end of the motor shaft which drives the projector mechanism through a belt and a large driven pulley 50 secured upon and rotating a pinion shaft 51. Mounted upon this pinion shaft and to the rear of the pulley is a small pinion gear meshing with and driving a large idler gear 53 which in turn meshes with and drives a sprocket gear 54 mounted upon a shaft 55. Secured to or provided on the hub of the sprocket gear 54 is a pulley wheel and upon the opposite end of this shaft is mounted the sprocket 30. A flexible take-up belt 57 is mounted upon the pulley and this belt rotates the take-up pulley 24 and take-up reel 23, or in rewinding operation, rotates the feed reel pulley 27 and feed reel 26.

Secured upon the inner end of the driven shaft 51 by a pin is a cam and pinned or otherwise secured to this cam is a shutter 60. The shaft 51 serves to drive the projector mechanism, and the cam and shutter 60 operate together to form lateral guides for the claw 61. A spring 65 holds the claw against the cam during its motion and serves to drive the claw in its upward and forward travel, with the rear end of the claw being pivoted upon a bushing 66. The use of a double follower surface on the claw operating against the cam and held in place against the cam face by means of the spring 65, provides extreme simplicity of the parts necessary for moving the film in its proper intermittent motion.

The projector is so constructed and arranged as to require but a single lamp or light source 67 for projection of the picture and for scanning the sound track. This lamp is positioned on the center line of the film and throws light through the sound condenser 68 onto the sound track of the film 28 as it passes over the sound drum 39.

The sound amplifier unit is mounted in the base 78 with the tubes 81 shown as mounted in the rear of the base. Upon the front of this base are the necessary controls for the unit such as the attachment connector 82, motor and lamp switch 83 and the volume control knob 84, as well as a cover 85 for the photoelectric cell. The amplifier base houses the various components which make up the electrical reproducing and amplifying system.

To prevent breaking off the prongs of the attachment plug 86, which quite commonly is thrown on the floor and may be accidentally stepped on, the male part or connector 82 of the attachment plug is mounted on the amplifier base. Both speaker cable 16 and current supply cord 88 are connected to the amplifier and projector mechanism through the single plug 86 instead of having separate and distinct connections as are ordinarily employed. This facilitates setting up the projector and simplifies its operation. If the current feed cord 88 is connected to the supply voltage before the plug 86 is connected to the plug or connector 82 on the base, it will still be impossible to get a shock as all metallic parts connected to the current supply are within the female plug 86. It is thus quite obvious that should the plug 86 be thrown on the floor and be stepped on or otherwise roughly handled, it will not be damaged or broken as easily as would the customary male plug. As the novel projector is designed for both alternating and direct current operation, the amplifier chassis or case 78 is completely shielded so that it is impossible for the operator to touch any metallic part of the chassis. In the preferred embodiment, the amplifier chassis is made of a plastic non-conductive material and is shielded by spraying its interior surface with molten metal such as lead or the like.

The lamp 67, which is positioned on the center line of the film, throws its light through the sound condenser 68 onto the sound track of the film as it passes over the sound drum 39. The reflector 89, mounted to the rear of the lamp, and the condensers 90, mounted to the front of the lamp and within the cylindrical housing 91, gather light from the lamp 67. The position of the lamp is adjustable.

The combined speaker baffle and screen unit 15 comprise a speaker baffle 94 pivoted to a screen by means of spring hinges and provided with a side flange or support 97. This flange is fastened rigidly to the baffle and extends at right angles to it. When folding the projector, the flange slips between the reel rack and the cabinet. This flange improves the baffle effect and in use, the screen is held up in operating position by spring friction in the hinges.

In order to tilt or adjust the elevation of the front of the projector unit or assembly, the invention comprehends a novel adjusting mechanism. This novel adjusting or tilting mechanism comprises a tilt leg 99 slidably mounted in a tilt bracket 100 and secured at 101 to the front wall of the case 1. A knob 103 is mounted on the end of this shaft and permits easy adjustment thereof, and the shaft controls the desired vertical positioning of the tilt leg by clamping it in its opening in the bracket 100. Thus by proper operation of the knob 103, the projector can be raised and lowered and locked at any desired height.

In the operation of the novel projector, the combined speaker baffle and screen unit is removed from the case and set in position. The feed reel arm 11 and the take-up arm 10 are then removed from the case and mounted in the position shown in Figs. 4 and 5, wherein the ends of these arms fit into and lock in the complementary openings 21 provided in the top plate 2. The detachable reel arms and the sockets or openings 21 are so contoured that the arms are automatically locked in operating position merely by inserting them in these sockets. The feed reel 26 containing the film is mounted on the end of the feed reel shaft 25 in the upper end of the feed reel arm 11. The take-up reel 23 is then mounted upon the end of the shaft 22 in the upper end of the take-up arm 10. The film 28 from the feed reel 26 is then threaded over a roller 46 in the plate 2 and about the roller 29, upper portion of sprocket 30, rollers 31 and between the pressure plate 32 and gate plate 33. From there, the film is threaded over the roller 40, sound drum 39, roller 41, thence to the roller 42, bottom surface of the sprocket 30, roller 43, spring tension roller 44, roller 46 and from there to the take-up reel 23. The knob 104 is secured on the end of the shaft for the motor 47 by which the motor and the mechanism driven thereby can be turned by hand during the threading operation so as to make sure that the threading is accomplished correctly.

The belt 57, which rotates the take-up reel 23 during operation of the projector, is extensible so that after projection is completed, rewinding is accomplished by threading film from the take-up reel directly across to the feed reel 26, which is now empty, and transferring this belt from the pulley 24 to the smaller rewind pulley 27 on the feed reel. Pulley 27 being smaller than pulley 24, rewinding is accomplished rapidly and without the necessity of removing the reels from their shafts. The belt 57 passes through the plate 2 and over the pulleys 105 provided therein.

From the above description and the disclosure in the drawings, it will be readily apparent that the invention comprehends a novel and compact sound motion picture projector which is light in weight, simple in operation and inexpensive. It may be quickly and easily transported and carried about, and is complete in every detail for optimum sound motion picture performance.

Having thus disclosed the invention, we claim:

1. In a sound motion picture projector, a carrying case adapted to enclose all items of equipment for a sound motion picture performance, a plate secured to the upper surface of the case, arms for mounting the feed and take-up reels during operation of the projector, the lower end of each arm being flanged with the adjacent flanged ends adapted to be received and anchored in a complementary opening in the plate and interlocked therewith for retaining said arms in angular, operative position with respect to each other and with the flanged ends in abutting relationship for rigidly mounting and retaining said arms during operation of the projector.

2. In a sound motion picture projector, a carrying case therefor, a plate secured to the upper surface of the case, arms for mounting the feed and take-up reels during operation of the projector, and interengaging projections on the arms and in the plate for securely but detachably mounting the arms in said plate, said inner engaging projections including projecting flanges on the lower end of each arm with the adjacent flanged ends adapted to be received and anchored in a complementary opening in the plate and interlock therewith for retaining said arms in angular, operative position with respect to each other, and with the flanged ends in abutting relationship for rigidly mounting and retaining said arms during operation of the projector.

FORREST O. CALVIN.
WILLIAM G. WILSON.
THOMAS R. SMITH.